US010164875B2

(12) United States Patent
Guichard et al.

(10) Patent No.: US 10,164,875 B2
(45) Date of Patent: Dec. 25, 2018

(54) SR APP-SEGMENT INTEGRATION WITH SERVICE FUNCTION CHAINING (SFC) HEADER METADATA

(71) Applicant: Cisco Technology, Inc., San Jose, CA (US)

(72) Inventors: James N. Guichard, New Boston, NH (US); Paul Quinn, Wellesley, MA (US); Carlos M. Pignataro, Raleigh, NC (US); Nagendra Kumar Nainar, Morrisville, NC (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 333 days.

(21) Appl. No.: 15/049,521

(22) Filed: Feb. 22, 2016

(65) Prior Publication Data

US 2017/0244631 A1 Aug. 24, 2017

(51) Int. Cl.
*H04L 12/723* (2013.01)
*H04L 12/741* (2013.01)
*H04L 12/725* (2013.01)

(52) U.S. Cl.
CPC ............ *H04L 45/50* (2013.01); *H04L 45/306* (2013.01); *H04L 45/74* (2013.01)

(58) Field of Classification Search
CPC ........ H04L 45/50; H04L 45/74; H04L 45/306
See application file for complete search history.

(56) References Cited

U.S. PATENT DOCUMENTS

2013/0272305 A1 10/2013 Lefebvre et al.
2015/0030020 A1 1/2015 Kini et al.
2015/0124815 A1 5/2015 Beliveau et al.
2015/0195197 A1* 7/2015 Yong ....................... H04L 45/74 370/392
2016/0028640 A1* 1/2016 Zhang ................... H04L 45/306 370/389
2017/0134538 A1* 5/2017 Mahkonen .............. H04L 69/22
2018/0054389 A1* 2/2018 Ao ........................ H04L 47/125

OTHER PUBLICATIONS

Halpern et al. "Service Function Chaining (SFC) Architecture" Internet Engineering Task Force (IETF); pp. 1-32; Oct. 2015.
Network function virtualization; https://en.wikipedia.org/wiki/Network_function_virtualization; pp. 1-7.
Quinn et al "Network Service Header draft-quinn-sfc-nsh-07.txt" Network Working Group; pp. 1-43; Feb. 24, 2015.

(Continued)

*Primary Examiner* — Habte Mered
(74) *Attorney, Agent, or Firm* — Parker Ibrahim & Berg LLP; James M. Behmke; Stephen D. LeBarron

(57) ABSTRACT

In one embodiment, a device in a network receives a packet that includes one or more forwarding labels and a service function chaining (SFC) header. The device removes the one or more forwarding labels from the packet. The device inserts an indication of the one or more forwarding labels into metadata of the SFC header. The device forwards the packet with the inserted indication of the one or more forwarding labels to a service function.

20 Claims, 16 Drawing Sheets

LINKS 102
DEVICE 200
100
106
CE1
PE1
CORE NETWORK 104
PE2
CE2

(56) References Cited

OTHER PUBLICATIONS

Halpern et al. "Service Function Chaining (SFC) Architecture draft-ietf-sfc-architecture-09" Network Working Group; pp. 1-29; Jun. 7, 2015.
Quinn, P. et al.: "Network Service Header; draft-ietf-sfc-nsh-00. txt," Internet Engineering Task Force, IETF; Standardworkingdraft, Internet Society (ISOC), 4, Rue des Falaises CH-1205 Geneva, Switzerland, Mar. 24, 2015, pp. 1-42.
Boucadair, M., Jacquenet, C., France Telecom; Parker, R., Affirmed Networks; Lopez, D., Telefonica I+D; Guichard, J., Pignataro, C., Cisco Systems, Inc.: "Service Function Chaining: Framework and Architecture; draft-boucadair-sfc-framework-02.txt," Internet Engineering Task Force, IETF; Standardworkingdraft, Internet Society (ISOC), 4, Rue des Falaises CH-1205, Geneva, Switzerland, Feb. 13, 2014, pp. 1-25.
International Search Report dated May 2, 2017 in connection with PCT/US2017/018394.

* cited by examiner

406

| VER 410 | O 412 | C 414 | RESERVED 416 | LENGTH 418 | MD TYPE 420 | NEXT PROTOCOL 422 |
|---|---|---|---|---|---|---|
| SERVICE PATH ID 424 | | | | | | SERVICE INDEX 426 |
| CONTEXT HEADER FIELD(S) 428 | | | | | | |

INSERT APP-SEGMENT ID

FIG. 4B

| LFIB | | | |
|---|---|---|---|
| IN | OUT | INTF | ACTION |
| S1 | UNLABEL | TO SERV. Fn. S1 | MOVE LABEL STACK TO METADATA |

| APP. SEGMENT | |
|---|---|
| IN | OUT |
| qqqq | SFF D<br>S2<br>SFF E<br>S3<br>X |

SR APP-SEGMENT INTEGRATION WITH SERVICE FUNCTION CHAINING (SFC) HEADER METADATA

TECHNICAL FIELD

The present disclosure relates generally to computer networks, and, more particularly, to integrating a segment routing (SR) application-segment with service function chaining (SFC) header metadata.

BACKGROUND

Multiprotocol label switching (MPLS) is a packet switching technology that allows routing decisions to be based on labels that are appended to the headers of packets. Such a label represents a path in the network and is used to make forwarding decisions until the corresponding packet reaches its destination. Once the packet reaches its destination, the destination device may "pop" (e.g., remove) the corresponding label from the header of the packet and/or apply another label to the packet, to continue routing the packet throughout the network.

Segment routing is a routing technology that may be used in conjunction with MPLS. For example, MPLS labels may be carried in routing protocol messages to enable segment routing in the network. Segment routing defines two forms of segments: adjacency segments and node segments. In general, adjacency segments correspond to a specific adjacency/interface of a given node. In contrast, node segments are more global in nature and represent the shortest path to a node. Notably, the target node of a node segment may be assigned a unique identifier used within the network. Thus, a label switched path (LSP) may be formed by concatenating any number of adjacency and/or prefix segments. When a device along an LSP receives a packet that has a segment as the top label, that label may be reused by any number of intermediary devices to route the packet to the target node associated with the segment. For example, assume that a path exists from nodes A→B→C→D. If node A receives a packet having a top label/node segment associated with node D, it may swap the label with itself and forward the packet to node B. Node B may perform a similar operation and forward the packet on to node C. Node C may then pop the label off of the stack and forward the packet with any remaining labels to node D.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4B illustrate an example packet;

DESCRIPTION OF EXAMPLE EMBODIMENTS

Overview

According to one or more embodiments of the disclosure, a device in a network receives a packet that includes one or more forwarding labels and a service function chaining (SFC) header. The device removes the one or more forwarding labels from the packet. The device inserts an indication of the one or more forwarding labels into metadata of the SFC header. The device forwards the packet with the inserted indication of the one or more forwarding labels to a service function.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
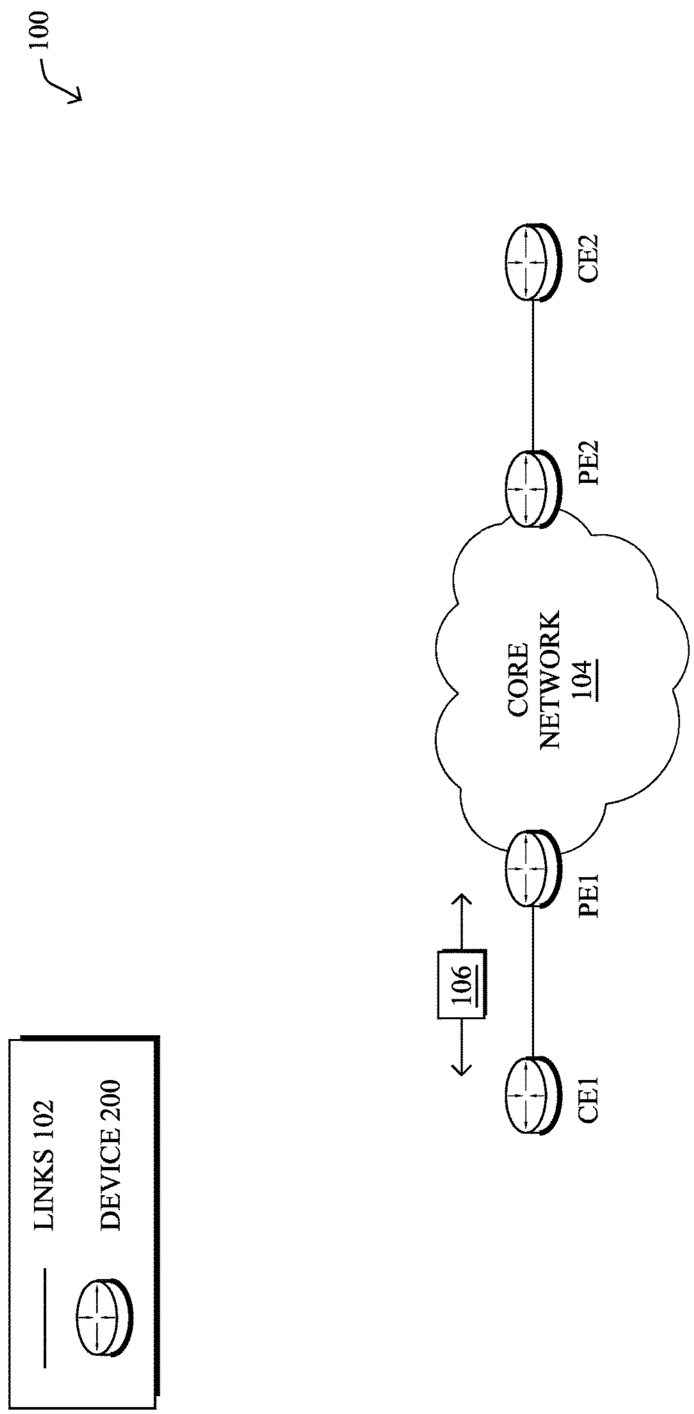
FIG. 1 illustrates an example communication network.

FIG. 1 is a schematic block diagram of an example computer network 100 illustratively comprising nodes/devices 200, such as a plurality of routers/devices interconnected by links or networks, as shown. For example, customer edge (CE) routers (e.g., CE1 and CE2) may be interconnected with provider edge (PE) routers (e.g., PE1 and PE2, respectively), to communicate across a core network, such as an illustrative core network 104. Core network 104 may be a Multi-Protocol Label Switching (MPLS) network or, alternatively, any other form of network (e.g., Internet-based, etc.).

Data packets 106 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 2:
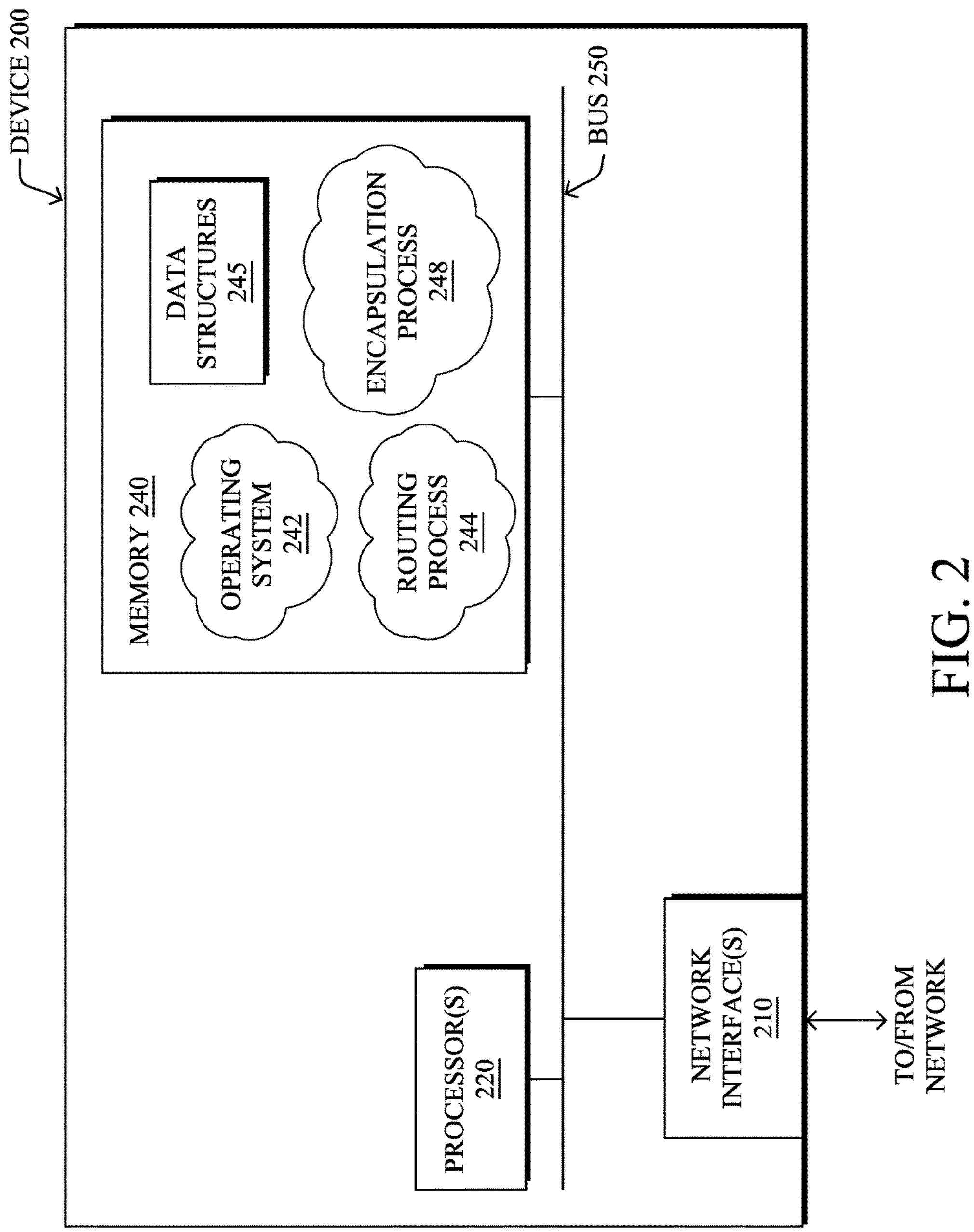
FIG. 2 illustrates an example network device/node.

FIG. 2 is a schematic block diagram of an example node/device 200 that may be used with one or more embodiments described herein, e.g., as any of the routers of network 100, or any other computing device that supports the operations of network 100 (e.g., switches, servers, etc.). Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may include a routing process 244 and/or a packet encapsulation/decapsulation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP) (e.g., in conjunction with process 248), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

In various embodiments, routing process 244 may be configured to perform segment routing in the network, such as, e.g., in conjunction with MPLS. For example, routing process 244 may utilize extensions to the IGP (e.g., IS-IS, OSPF, etc.), that allow IGP messages to carry MPLS label information, to enable segment routing (MPLS-SR). As noted previously, segments in a segment routed network may fall into one of two categories: node segments and adjacency segments. Adjacency segments generally represent the local interface between a given node and an adjacent neighbor. Notably, adjacency segments do not need to be unique among the different nodes, as adjacency segments only require local significance to the particular node. Node segments, in contrast, are global in nature and use unique identifiers to represent node segment endpoints. When used in conjunction with MPLS, segments (e.g., node and adjacency segments) may be treated as labels, whereby a node may either "push" a new segment/label onto the stack, "pop" (e.g., remove) the top segment/label from the stack, or "swap" the top label of the stack with another label.

In further embodiments, routing process 244 may be operable to implement the Service Function Chaining (SFC) architecture. Details regarding the SFC architecture can be found in the Internet Engineering Task Force (IETF) request for comments (RFC) 7665 entitled, "Service Function Chaining (SFC) Architecture" by J. Halpern, et al., which is hereby incorporated by reference. In general, SFC facilitates the use of network services and provides for network location techniques to locate the device(s) that support these services. Example services may include, but are not limited to, caching services, firewall services, anti-intrusion services, malware detection services, deep packet inspection (DPI) services, acceleration services, load balancing services, lawful intercept (LI) services, optimization services, etc. In particular, a service function chain comprises an ordered set of services that may be provided to network traffic based on the classification of the traffic.

As part of the SFC architecture, a service function path (SFP) may be defined that indicates to which services a certain packet must be sent (e.g., which services are to perform their respective functions on the packet). The packet/frame may then be encapsulated, to include an indication of the SFP. Of note is that SFC encapsulation is used solely to include data plane context information and is not used for purposes of network packet forwarding. In particular, a network service header (NSH) may be added to a packet or frame, to convey metadata and service path information that may be used to create the service plane. For transport, the NSH and packet may be encapsulated in an outer header. Details regarding an NSH protocol header can be found in the IETF draft entitled, "Network Service Header," by P. Quinn, et al., the contents of which are hereby incorporated by reference.

As noted above, the NSH architecture provides the mechanisms for the construction of service chains in a network and the forwarding of traffic through those service chains using network service headers carried within the data plane. The network service headers are imposed on to the original packet/frame through classification. An outer encapsulation used for transport between individual services of the service chain is then pushed on to the packet/frame. Forwarding of packets/frames is achieved at the service plane layer using the NSH headers. Specifically, a Service Path Identifier (SPI) and Service Index (SI) are used for this purpose. A unique SPI is used to identify a given service path instantiation of a service chain, and the SI is initialized to the total number of services within the service chain, and decremented at each service hop as packets/frames traverse through the service path.

Figure 3A:
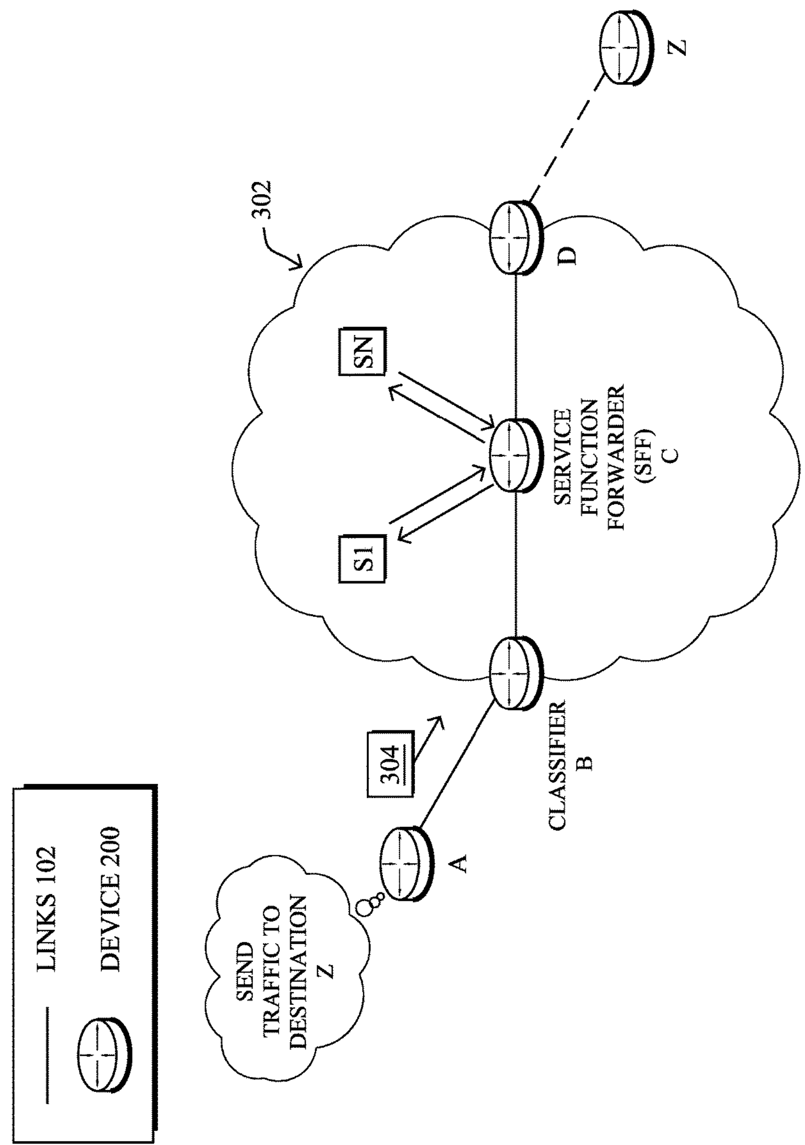
FIGS. 3A-3D illustrate examples of service function paths (SFPs) being used to convey traffic.

Referring now to FIGS. 3A-3D, examples are shown of SFPs being used to convey traffic, according to various embodiments. As shown in FIG. 3A, assume that nodes A-Z exist along a path that traverses network portion 302 (e.g., an MPLS-SR core network, etc.). In particular, assume that node A is to send traffic to node Z via the path shown. Further, assume that node B is an SFC classifier and that node C is an SFF configured to forward packets to any number of service functions (e.g., N-number of service functions S1, S2, etc.). For example, S1 may be a content filtering service, S2 may be a NAT service, etc. In some cases, the service functions may be provided by separate network devices than that of SFF C. However, as service functions in an SFC can be virtualized, service functions can also be implemented locally on node C, in other implementations. As would be appreciated, the nodes shown are presented in a simplified manner and the path between nodes A and Z may comprise any number of intermediary nodes and/or service functions.

To establish an SFP, Open Daylight (ODL), or another similar mechanism, may be used to send appropriate instructions to the various nodes shown. In particular, an SFP may be established by programming the nodes with a unique SPI that identifies the SFP. Further, service function classifier device/node B may also be programmed with classification rules that are used by classifier node B to make SFC decisions based on the different types of user traffic that may be sent via node B. For example, one classification rule may require only HTTP traffic to pass through content filtering service function S1, whereas other types of traffic may not require this service.

For purposes of illustration only, assume that node A sends user traffic 304 towards a destination node Z. In various embodiments, user traffic 304 may include any number of packets that are part of a traffic flow. For example, in some cases, user traffic 304 may be a multimedia traffic flow (e.g., conveying audio and/or video) and may be multiplexed (e.g., on the same 5-tuple). User traffic 304 may also be unidirectional (e.g., only from node A to node Z) or multidirectional, in various cases.

Figure 3B:
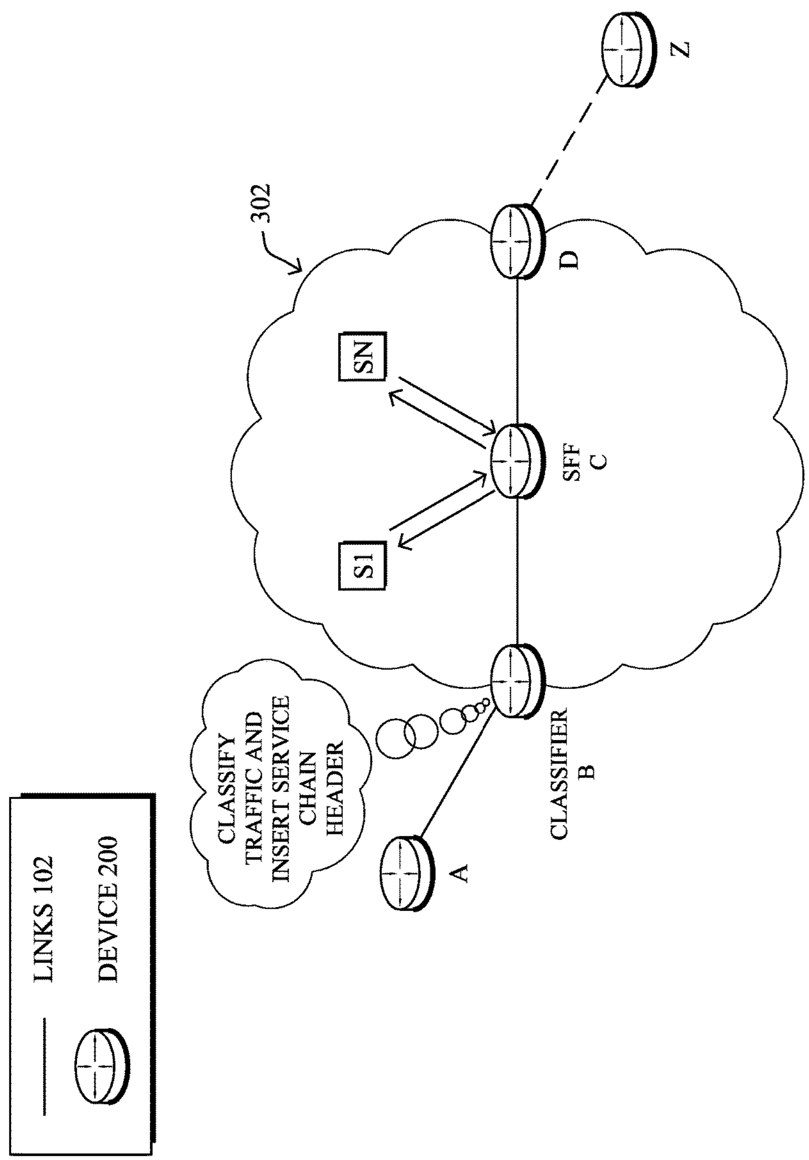

As shown in FIG. 3B, classifier node B may classify traffic 304 according to its programmed classification rules. For example, classifier node B may classify traffic 304 by its type (e.g., the application associated with the traffic, etc.), its address information (e.g., the address and/or port of the source and/or destination device), or any other information that may be used to select a particular SFP for the traffic. Based on the classification, classifier node B may then construct an SFC header and encapsulate traffic 304 using the header. For example, classifier node B may select the SPI and SI associated with the classification and, in turn, may construct an NSH header for traffic 304 that indicates the selected values.

Figure 3C:
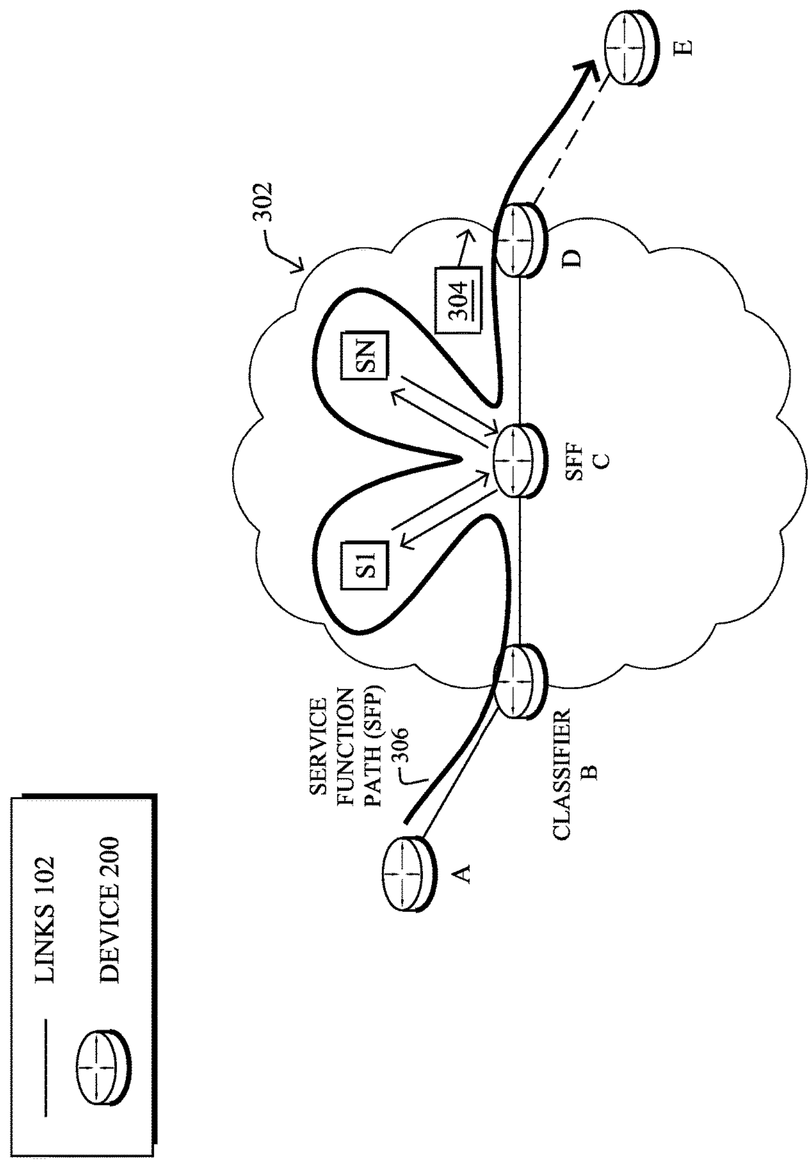

A first SFP 306 that may be selected by classifier B for traffic 304 is shown in FIG. 3C. In particular, the NSH header added to traffic 304 may indicate that traffic 304 should be sent to both service functions S1 and SN for processing. Notably, in response to receiving an NSH-encapsulated packet, SFF C may determine that traffic 304 should be sent first to service function S1 for processing, then on to service function SN, before being forwarded towards its intended destination, node E.

Figure 3D:
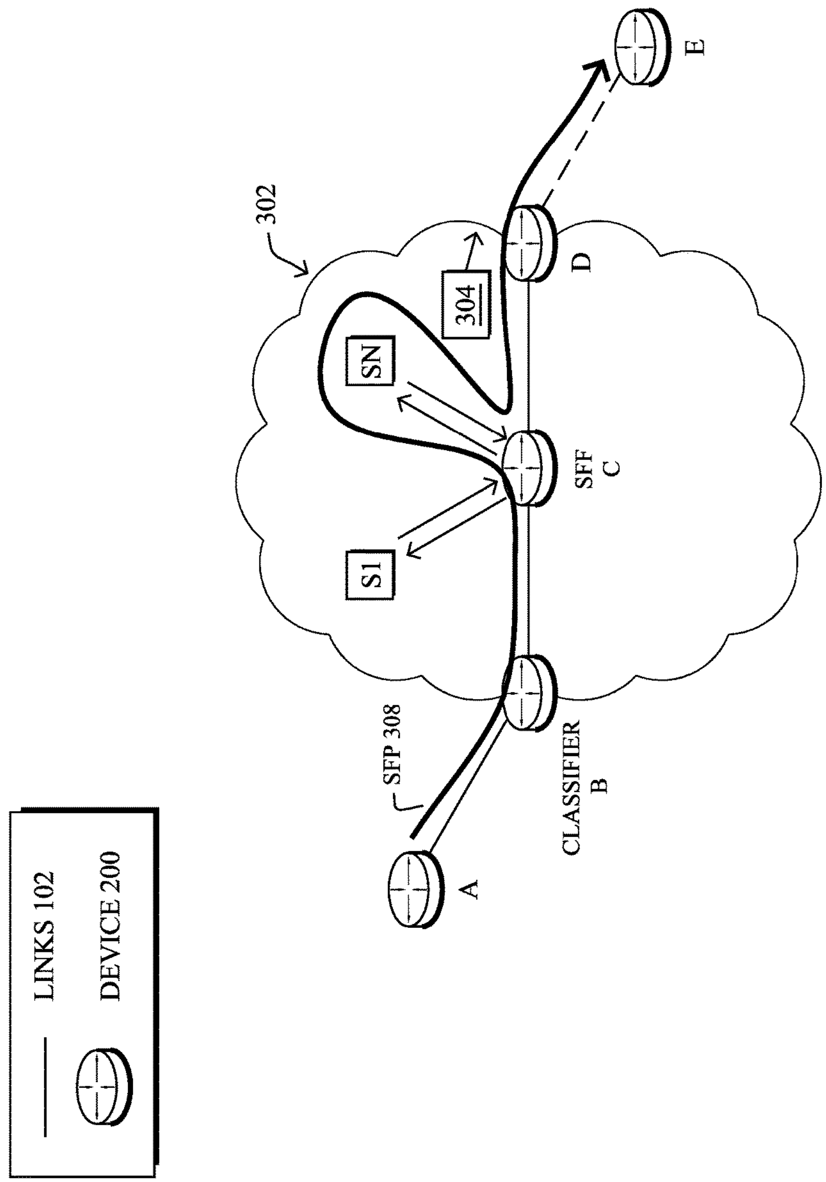

As shown in FIG. 3D, traffic 304 may traverse an alternate SFP 308, based on the NSH header inserted into traffic 304. For example, while SFP 306 includes both service functions S1 and SN, SFP 308 instead only includes service function SN. Thus, the classification of traffic 304 may affect which SFP, if any, the traffic will traverse before delivery to its destination.

As noted above, NSH is a data plane protocol used specifically to construct service chains and is processed by NSH-enabled network services. In addition, segment routing provides a mechanism to specify explicit nodes through which a packet must traverse. However, if the path includes network service functions, segment routing information (e.g., the label stack or IPv6 extension header) must be removed from the packet, prior to sending the packet to the service function. Notably, service functions are not typically configured to process extraneous information, such as SR forwarding labels. This places a burden on the network operator and the network devices to ensure that correct, and often complex, classifications are in place for packets after being processed by a service function.

SR App-Segment Integration with SFC Header Metadata

The techniques herein leverage metadata in an SFC header, such as an NSH-based header, to ensure that correct SR information is retained during and after a packet is processed by a service function. Doing so also eliminates the need for complex reclassification of the packet after processing by the service function (e.g., to add SR or other forwarding information to the returned packet) and requiring coordination between the services and the configuration of the network. In some aspects, when an SFF is to forward a packet on to a service function, the SFF may pop the SR label stack from the packet, push an app-segment ID from a local pool of identifiers to the metadata of the SFC header, and store the removed SR label stack and the app-segment ID in a local table. In turn, when the packet is returned from the service function, the SFF may retrieve the removed label stack based on the app-segment ID and append the stack back onto the packet before forwarding the packet on in the network (e.g., to the next SFF, etc.). In other aspects, the SFF may alternatively move the entire label stack to the metadata of the SFC header before sending the packet to the service function and move the label stack back to its original place after the packet is processed by the service function.

Specifically, according to one or more embodiments of the disclosure as described in detail below, a device in a network receives a packet that includes one or more forwarding labels and a service function chaining (SFC) header. The device removes the one or more forwarding labels from the packet. The device inserts an indication of the one or more forwarding labels into metadata of the SFC header. The device forwards the packet with the inserted indication of the one or more forwarding labels to a service function.

Illustratively, the techniques described herein may be performed by hardware, software, and/or firmware, such as in accordance with the process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, and as such, may be processed by similar components understood in the art that execute those protocols, accordingly.

Figure 4A:
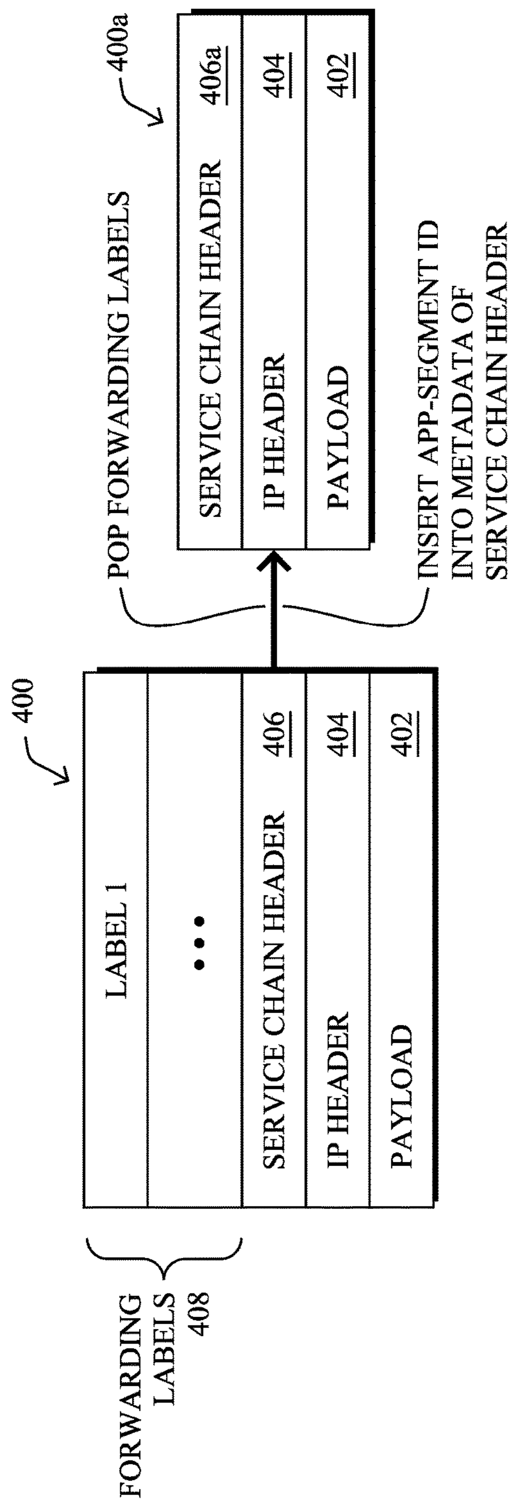

Operationally, an example packet is shown in FIGS. 4A-4B, according to various embodiments. Generally, packet 400 may include a payload 402 (e.g., application data, etc.) and a corresponding header 404 for use outside of the core network. For example, header 404 may be an IPv4 or IPv6 header, in some embodiments, that indicates the source address of the device that originated packet 400 and the address of the destination device of packet 400.

In some implementations, packet 400 may be further encapsulated (e.g., by encapsulation/decapsulation process 248) by an SFC header 406, such as an NSH-based header. Generally, SFC header 406 may be operable to cause packet 400 to be forwarded along a particular SFP for processing by any number of different service functions. For example, SFC header 406 may cause packet 400 to be processed by a caching service function, a firewall service function, a load balancing service function, an optimization service function, etc.

Packet 400 may further include a set of forwarding labels 408 used to forward packet 400 between network devices. In some embodiments, forwarding labels 408 may be MPLS-SR forwarding labels that each identify a particular segment. In such a case, forwarding labels 408 may form a "segment header" that is identified by a series of segment identifiers (SIDs) and encapsulates SFC header 406.

According to various embodiments, an SFF or other device receiving packet 400 may modify packet 400 to form a modified packet 400*a* to be sent to a service function. In some embodiments, the receiving device may pop the stack of forwarding labels 408 from packet 400, thereby removing labels 408 from packet 400. In addition, the device may modify SFC header 406 of packet 400 to form a modified SFC header 406*a* that identifies forwarding labels 408. In some embodiments, the device may do so by inserting an "app-segment ID" into the metadata of SFC header 406*a* that is associated with the popped forwarding labels 408. The device may store the removed labels and such an association in a local lookup table, in some embodiments. In further embodiments, the device may simply move forwarding labels 408 directly into the metadata of modified SFC header 406*a*.

After receiving packet 400*a* back from the target service function, the SFF or other device may reverse the above process, to re-encapsulate modified packet 400*a* with the segment header that includes forwarding labels 408. For example, the device may perform a lookup of the inserted app-segment ID from modified SFC header 406*a*, to retrieve the previously removed labels 408 and to add these labels back to packet 400*a*. In other embodiments, the device may remove any of labels 408 that were directly inserted into the metadata of SFC header 406*a* and re-append the labels to modified packet 400*a*, before sending packet 400*a* on to another device. In other words, the device may reconstitute the segment header of packet 400*a*, prior to forwarding packet 400*a* on in the network.

Referring now to FIG. 4B, an example of SFC header 406 is shown, according to various embodiments. As shown, header 406 may be applied to a packet that is to be sent along a given SFP/RSP (e.g., based on one or more classification rules of a classifier device). In turn, a node along the path may analyze header 406 of the encapsulated packet, to determine which service functions, if any, are to process the packet and in what order. In some embodiments, the packet may be further encapsulated after application of header 406, e.g., according to the various routing protocols available. For illustrative purposes only, header 406 is depicted as an NSH-based header. However, in other embodiments, header 406 may conform to any other SFC protocol.

As shown, header 406 may include base header fields/bits 410-422. Particularly, version field 410 may indicate the NSH version and may be set to 0x0, if the initial version of NSH is used. O bit 412 may indicate whether or not header 406 is an operations, administration and management (OAM) packet. C bit 414 may indicate whether header 406 includes a critical type-length-value (TLV). Header 406 may further include any number of reserved bits 416 that may be used, e.g., in subsequent versions of NSH. Length field 418 may be a four byte word that indicates the total length of the NSH encapsulation, including any optional TLVs used. MD Type field 420 may be set to indicate whether the header includes fixed-length context headers or, alternatively, variable length context information. Finally, header 406 may include a next protocol field 422 that indicates the type of the protocol originating the packet. For example, next protocol field 422 may be set to 0x1 to indicate that the packet was originated by IPv4, may be set to 0x2 to indicate that the packet was originated by IPv6, etc.

Header 406 also includes service path header fields 424-426. Service Path ID (SPI) field 424 may uniquely identify a service function path. For example, SPI field 424 may include 24 bits that can be set to represent a particular service path. Service index (SI) field 426 may indicate the number of services along the path indicated by field 424 that still need to process header 406. As header 406 is processed during transit by a service function, SI field 426 may be decremented, accordingly.

Header 406 may further include any number of context header fields 428 in which metadata may be stored. In accordance with NSH, the number and size of fields 428 may be a function of the value set in MD Type field 420. Notably, if MD Type field 420 is set to be 0x1, context header fields 428 may comprise four mandatory context headers, each having four bytes. However, if MD Type field 420 is set to be 0x2, header 406 may include zero or more context header fields 428. In such a case, any metadata included in context header fields 428 may further indicate type-length-value (TLV) information such as the class, type, and length of the particular metadata.

According to some embodiments, an SFF or other device processing packet 400 may insert metadata information regarding the popped forwarding labels 408 into context header fields 428. For example, in some cases, the device may insert an SR app-segment ID into context header fields 428. Such an ID may be a pointer to the removed labels stored locally by the device while the packet is processed by the service function. In other cases, the device may insert the entire set of removed SR labels as metadata into context header fields 428.

In various embodiments, the following NSH MD Type 2 type-length-values (TLVs) may be reserved and used in header 406 as follows:

TABLE 1

| Type | Description |
|---|---|
| 95 | SR App-Segment ID |
| 96 | SR Stack |

In particular, as shown above in Table 1, the device may use type '95' in context header fields 428 to signify that only an app-segment ID was inserted into the metadata of header 406. Conversely, type '96' may be used to signify that the entire stack of forwarding labels 408 have been inserted into context header fields 428. As would be appreciated, other types may be reserved in other embodiments. In other words, the above types of '95' and '96' are exemplary only and any other type may be used. Further, it is also to be appreciated that additional metadata may be included in context header fields 428, independent of the information regarding the removed forwarding label stack (e.g., metadata to be used by a particular service function while processing the packet, etc.).

Figure 5A:
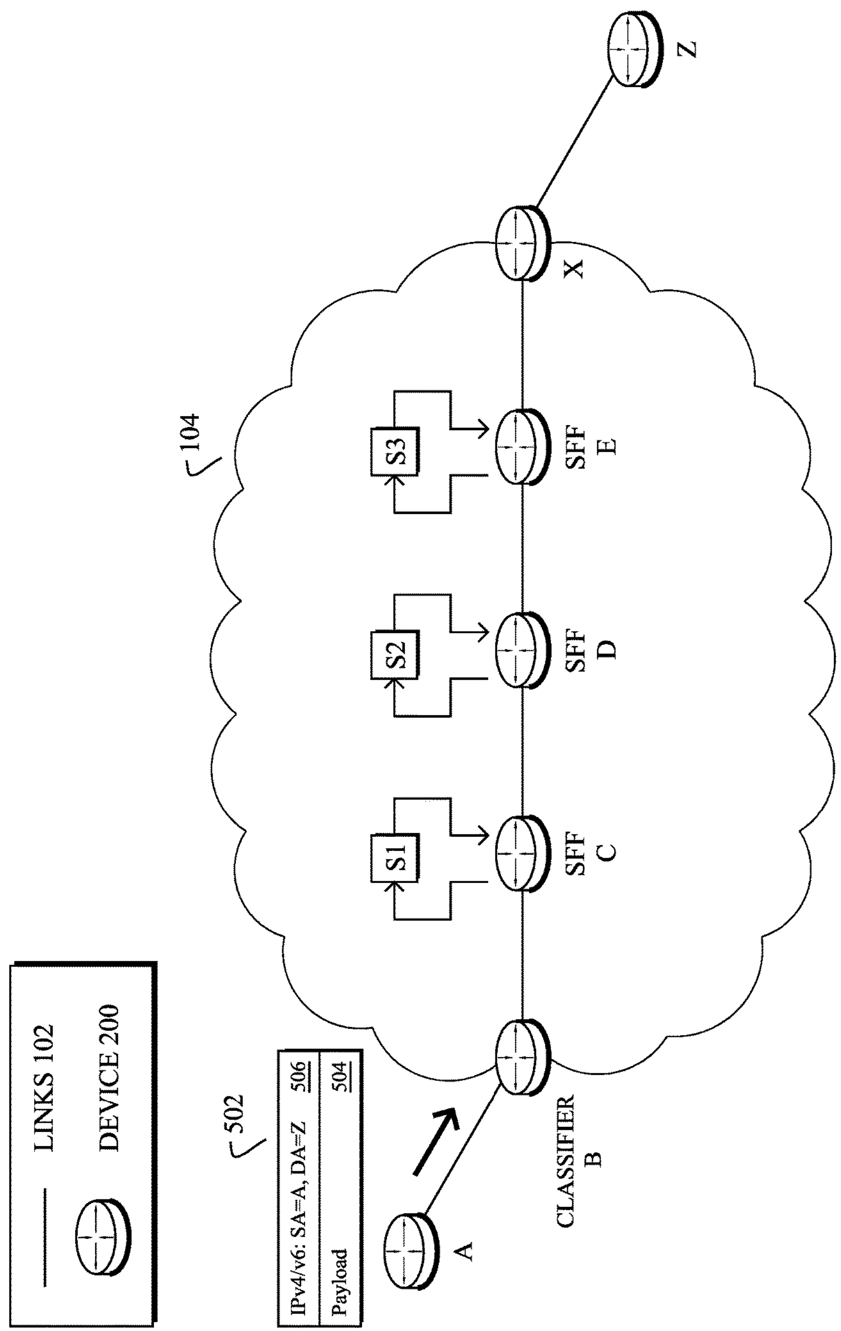
FIGS. 5A-5B illustrate an example packet being sent via an SFP.
Figure 5B:
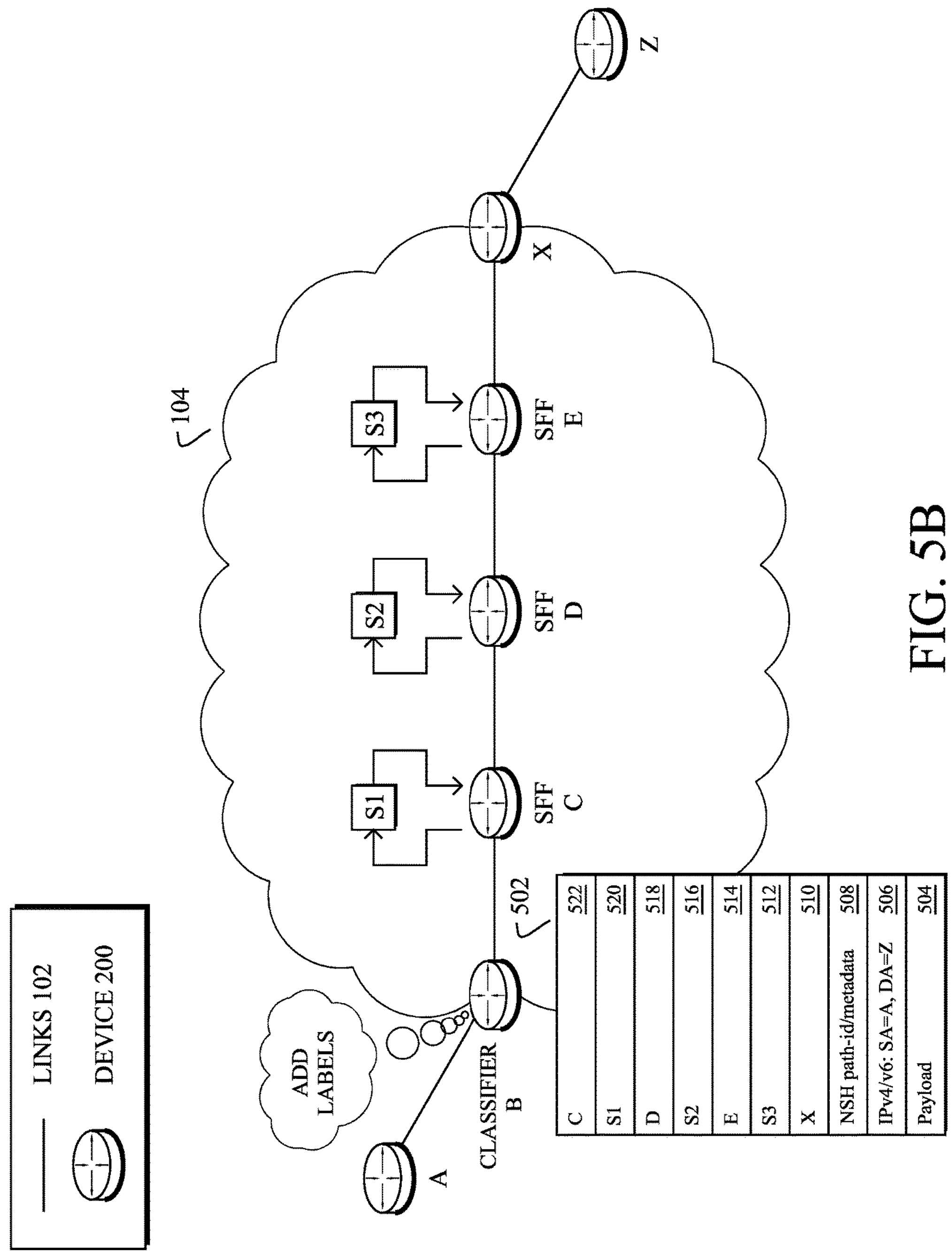

Referring now to FIGS. 5A-5B, an example is illustrated of a packet being forwarded to a service function, according to various embodiments. As shown in FIG. 5A, assume that a source node A sends a packet 502 towards a destination node Z via a network that includes core network 104 (e.g., an MPLS-SR core network, etc.). Initially, packet 502 may include only a payload 504 and an IP header 506 (e.g., an IPv4 or IPv6 header) that identifies the source and destination devices.

As shown in FIG. 5B, in response to receiving packet 502, classifier node B (e.g., an ingress device or another device in communication therewith) may determine whether packet 502 should be sent through a service chain and, if so, which services should be applied to packet 502. For example, device B may classify packet 502 from device A based on the information in header 506 (e.g., the source address, the destination address, etc.), based on an application associated with packet 502, based on the payload 504, etc. In turn, device B may add an SFC header 508 to packet 502. Notably, classifier device B may determine which, if any, of service functions S1-S3 shown should process packet 502. In some embodiments, SFC header 508 may be an NSH protocol header that includes metadata for use by the services in the service chain, an identification of the service path (e.g., SPI, etc.), or the like. As would be appreciated, the service path may not be used for purposes of actually forwarding packet 502, but instead simply provide context to the data plane regarding the service chain.

Classifier device B may also generate a set of forwarding labels 510-522, to forward packet 502 throughout core network 104. In various embodiments, the forwarding labels may correspond to a set of SIDs that identify a set of network segments. Notably, the generated forwarding labels may be used to represent the corresponding set of devices/services via which packet 502 should be forwarded. For example, labels 510-522 may be ordered according to the order in which the devices/services are to process packet 502. Device B may then add the ordered labels 510-522 to packet 502, thereby encapsulating SFC header 508.

FIGS. 6A-6E illustrate an example of a packet being forwarded to a service function, according to various embodiments. Continuing the example of FIGS. 5A-5B, assume that SFF C receives packet 502 including forwarding labels 510-520 in its segment header. In particular, the topmost label 520 of packet 502 may indicate that SFF C is to forward packet 502 to service function S1. In response, SFF C may pop label 520 from the stack of packet 502.

Figure 6A:
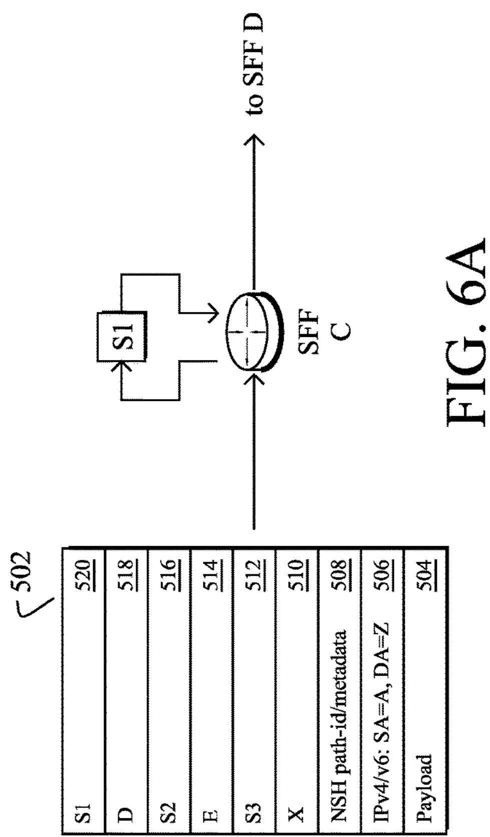
FIGS. 6A-6E illustrate an example of a packet being forwarded to a service function.
Figure 6B:
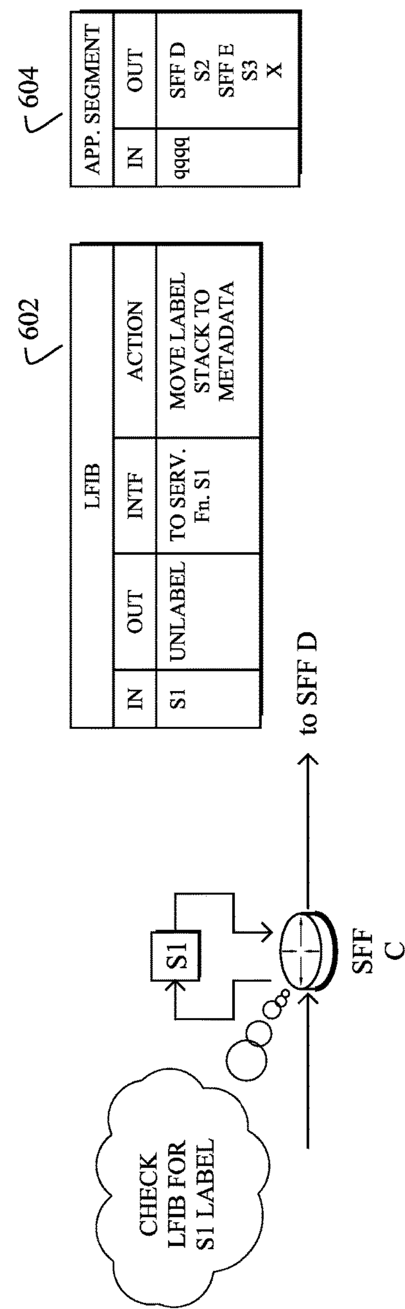

As shown in FIG. 6B, prior to forwarding packet 502 to service function S1, SFF C may perform a lookup of label 520 in a local table, such as local forwarding information base (LFIB) 602 (e.g., a forwarding table in data structures 245). LFIB 602 may associate forwarding labels with actions to be performed by SFF C when a particular label is received as the topmost label of an incoming packet. For example, an entry in LFIB 602 for label 520 may indicate that the packet is to be forwarded to service function S1 and that its current SR label stack is to be pushed to metadata in the SFC header of packet 502. In turn, SFF C may remove the remaining forwarding labels in the stack (e.g., labels 510-518) from packet 502.

In various embodiments, SFF C may also perform a lookup of the forwarding label stack of packet 502 in a local app-segment table 604 (e.g., a table in data structures 245), to determine whether a matching app-segment ID already exists for the label stack. If not, SFF C may generate a new app-segment ID and create an entry in table 604 that associates the new app-segment ID with the forwarding label stack of packet 502. Generally, the app-segment ID may be a unique identifier (e.g., a pointer) that can be used by SFF C to retrieve the corresponding forwarding label stack from table 604 at a later time. SFF C may also occasionally clear entries from app-segment table 604 (e.g., after a threshold amount of time since SFF C encountered a packet with the SR label stack associated with a particular app-segment ID, in response to receiving an instruction to do so, etc.).

Figure 6C:
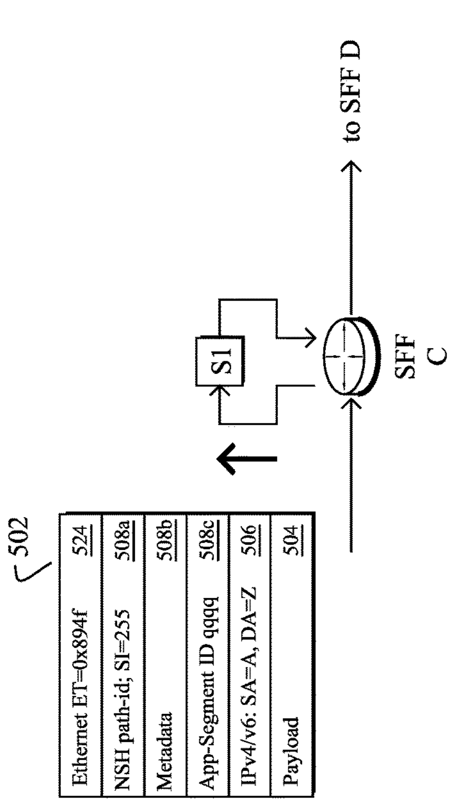

As shown in FIG. 6C, SFF C may send a modified version of packet 502 to service function S1. Notably, SFF C may strip the segment header from packet 502, prior to sending packet 502 to service function S1. In addition, SFF C may insert the app-segment ID associated with the removed label stack as metadata into SFC header 508. For example, as shown, header 508 may include NSH-based fields/bits 508*a* (e.g., SPI, SI, etc.), any preexisting metadata 508*b* (e.g., in an existing NSH context field header, etc.), and the inserted app-segment ID 508*c* associated with the removed label stack stored in table 604. In various embodiments, SFF C may also encapsulate the modified packet 502 using header 524, as needed, to convey packet 502 to service function S1. For example, SFF C may encapsulate packet 502 for transmission to service function S1 via Ethernet, Generic Routing Encapsulation (GRE), VXLAN-GPE, or the like, in accordance with the NSH protocol.

Figure 6D:
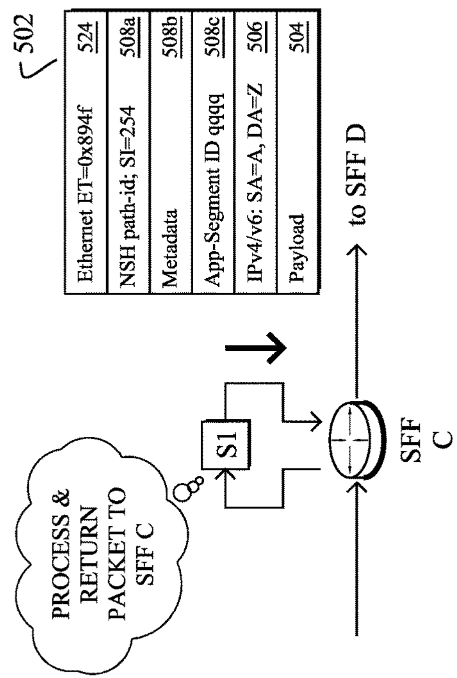

As shown in FIG. 6D, service function S1 may perform its corresponding function on packet 502. For example, service function S1 may perform a DPI function, firewall function, etc. on packet 502. After completion of the processing, service function S1 may return packet 502 back to SFF C, allowing packet 502 continue to be forwarded in the network towards its intended destination (e.g., node Z).

Figure 6E:
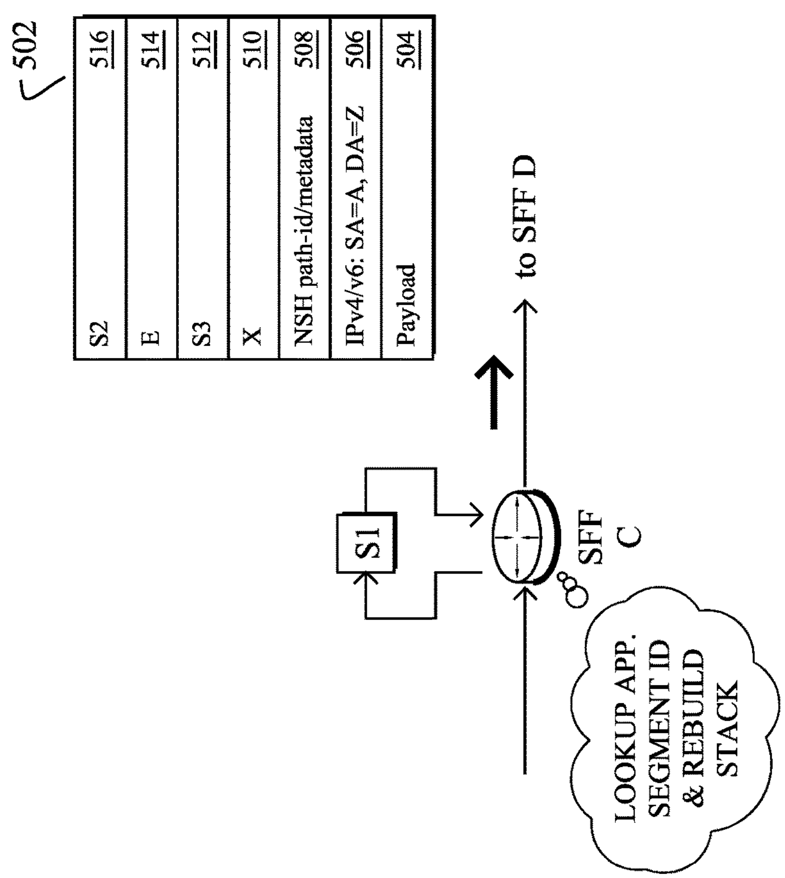

In FIG. 6E, in response to receiving packet 502 from service function S1, SFF C may perform a local lookup of app-segment ID 508*c* previously inserted into the SFC header of packet 502. In particular, SFF C may search local table 604 for app-segment ID 508*c* and its associated forwarding label stack (e.g., labels 510-518). In turn, SFF C may re-add the retrieved label stack to packet 502, pop the topmost label (e.g., label 518), and forward packet 502 along the segment associated with the popped label (e.g., on to SFF D).

Figure 7A:
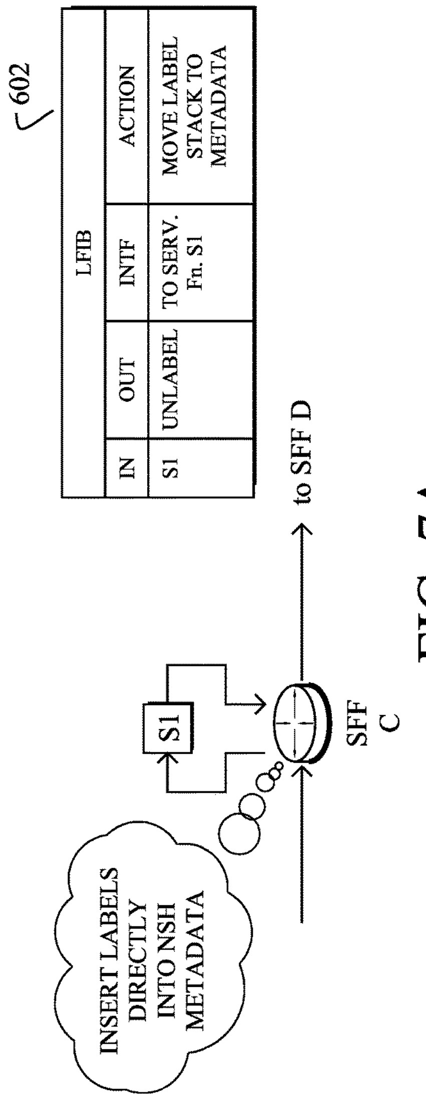
FIGS. 7A-7D illustrate a further example of a packet being forwarded to a service function.

Referring now to FIGS. 7A-7D, a further example is shown of a packet being forwarded to a service function, according to additional embodiments. As noted previously, an alternative embodiment entails the SFF inserting the actual forwarding label stack as metadata into the SFC header of the packet. For example, as shown in FIG. 7A, consider the case in which SFF C receives packet 502, similar to the example shown in FIG. 6A. However, in the example shown in FIG. 7A, the corresponding action for label 520 in LFIB 602 may instead indicate that SFF C should insert the actual segment header of packet 502 as metadata into the SFC header of packet 502.

Figure 7B:
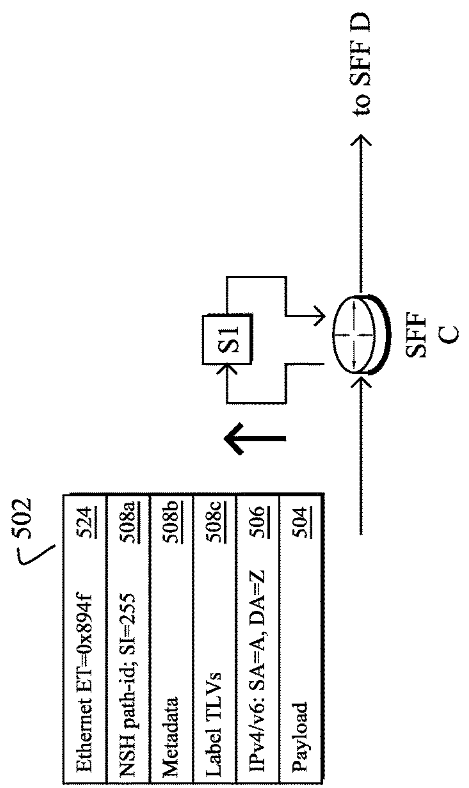

As shown in FIG. 7B, SFF C may carry out the action indicated in LFIB 602 by modifying packet 502 to include the removed segment header as label TLVs 508*c* in the metadata of SFC header 508 (e.g., in the context headers of an NSH-based header, etc.). In various embodiments, SFF C may be configured to only move the segment header into the metadata of the SFC header, to only insert an app-segment ID into the SFC header metadata, or determine which action to take based on other factors. For example, SFF C may opt to insert the forwarding labels into the metadata of the SFC header instead of an app-segment ID, if the size of the segment header is less than a threshold size.

Figure 7C:
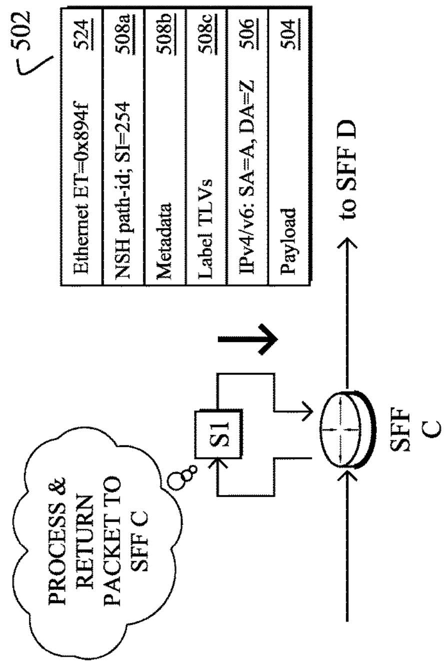

In FIG. 7C, after service function S1 processes packet 502, it may return the packet, including label TLVs 508*c* in its SFC header 508, to SFF C. As would be appreciated, a packet may or may not be returned by a service function. For example, certain service functions (e.g., content filters, intrusion protection services, etc.) may simply block any further transmission of an offending packet.

Figure 7D:
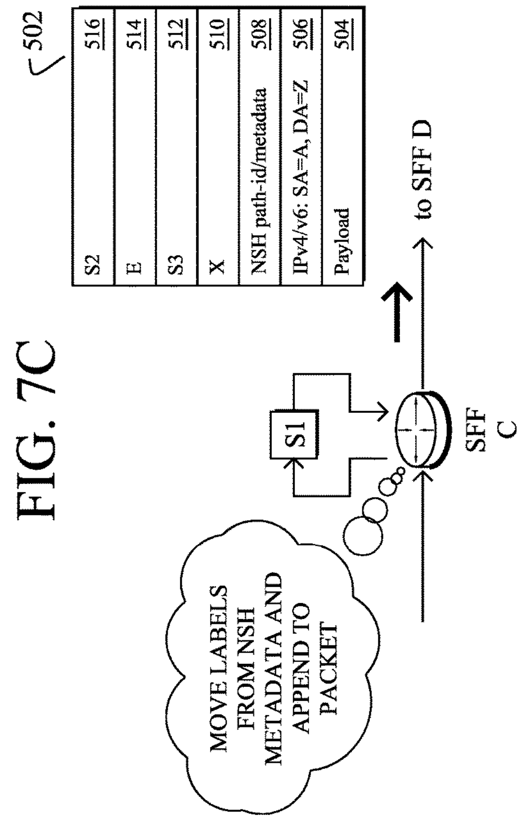

As shown in FIG. 7D, in response to receiving the returned packet 502 from service function S1, SFF C may move the forwarding labels from label TLVs 508*a*. In turn, SFF C may recreate the segment header by appending the forwarding labels to packet 502. Processing of packet 502 may then proceed as normal, to continue forwarding the packet in the network. For example, SFF C may pop label 518 from the replaced segment header and, based on a local lookup of label 518, forward packet 502 on to SFF D.

Figure 8:
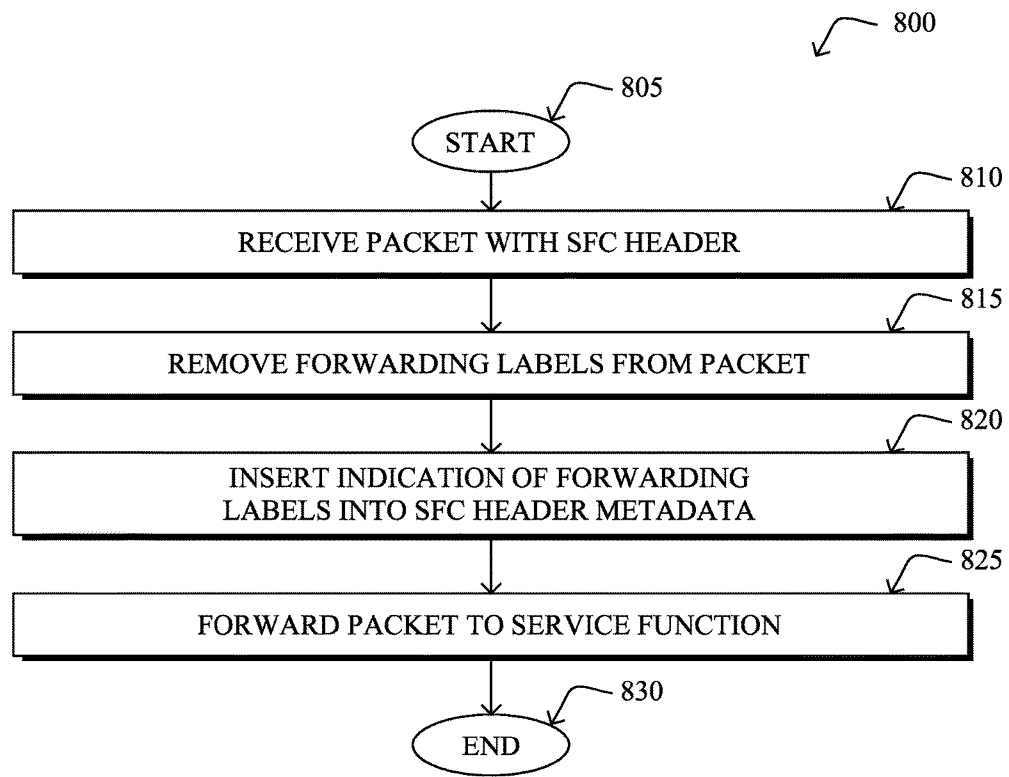
FIG. 8 illustrates an example simplified procedure for processing a packet.

FIG. 8 illustrates an example simplified procedure for processing a packet, in accordance with one or more embodiments described herein. Generally, procedure 800 may be performed by a specialized computing device (e.g., device 200) executing stored instructions. For example, procedure 800 may be performed by a service function forwarder (SFF) or another device in communication therewith. The procedure 800 may start at step 805, and continues to step 810, where, as described in greater detail above, the device receives a packet that includes an SFC header. For example, the SFC header may be an NSH-based header. According to various embodiments, the received packet with the SFC header may be further encapsulated by a stack of forwarding labels, such as a segment header.

At step 815, as detailed above, the device may remove the forwarding labels from the received packet. For example, the device may strip the outer segment header from the packet, to expose the SFC-based header of the packet. In various embodiments, the device may perform a lookup of the topmost forwarding label (e.g., a label for a service function) in its local LFIB, to determine which actions should be performed by the device on the packet, if any.

At step 820, the device may insert an indication of the forwarding labels of the packet into the metadata of the SFC header, as described in greater detail above. In some embodiments, the device may insert the forwarding labels as metadata directly into the SFC header (e.g., as a TLV in a context header field of an NSH-based header, etc.). In other embodiments, the indication may comprise an app-segment ID associated with the forwarding labels. In turn, the device may store the forwarding labels in a local table with an association to the inserted app-segment ID. For example, in response to receiving the packet to be forwarded to the service function, the device may determine whether an app-segment ID exists in a local table that corresponds to the forwarding labels of the packet. If not, the device may create an entry that includes such an identifier and the label stack.

At step 825, as detailed above, the device may forward the packet with the inserted indication of the one or more forwarding labels to a service function. As the service function may not be configured to process the forwarding labels, this allows the segment header of the packet to be removed prior to the packet being sent to the service function. If the service function then returns the packet to the device (e.g., after performing the service on the packet), the device may reconstitute the segment header before forwarding the packet to another device in the network. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, improve the functioning of the devices in a segment routed network by allowing the devices to also support service function chaining. In particular, the techniques herein allow a packet to be decapsulated from its segment header prior to the packet being sent on to a service function. An indication of the removed forwarding labels is also inserted into the metadata of the SFC header of the packet, prior to forwarding the packet to the service function. After the packet is returned from the service function, the segment header can then be reconstituted based on the indication in the SFC header, thereby removing any need for the device to have to reclassify the packet.

While there have been shown and described illustrative embodiments that provide for the integration of SFC techniques with segment routed networks, it is to be understood that various other adaptations and modifications may be made within the spirit and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

receiving, at a device in a network, a packet that includes one or more forwarding labels and a service function chaining (SFC) header;

removing, by the device, the one or more forwarding labels from the packet;

inserting, by the device, an indication of the one or more forwarding labels into metadata of the SFC header, wherein the indication includes an application segment identifier associated with the one or more forwarding labels;

associating, by the device, the application segment identifier with the one or more forwarding labels;

storing, by the device, the one or more forwarding labels in a local table of the device; and forwarding, by the device, the packet with the inserted indication of the one or more forwarding labels to a service function.

2. The method as in claim 1, further comprising:

adding, by the device, an entry for the application segment identifier in the local table, in response to determining that the entry does not already exist in the local table.

3. The method as in claim 1, further comprising:

receiving, at the device, the send packet from the service function; and appending, by the device, the stored one or more forwarding labels to the packet.

4. The method as in claim 1, wherein inserting the indication of the one or more forwarding labels into the metadata of the SFC header comprises:

inserting, by the device, the one or more forwarding labels into the metadata of the SFC header.

5. The method as in claim 1, further comprising:

receiving, by the device, the sent packet from the service function;

removing, by the device, the one or more forwarding labels from the metadata of the SFC header of the packet received from the service function; and appending, by the device, the one or more forwarding labels to the packet.

6. The method as in claim 1, wherein the SFC header comprises a Network Service Header (NSH)-based header.

7. The method as in claim 6, wherein the indication is inserted into an MD Type-2 type-length-value (TLV) of the NSH-based header.

8. The method as in claim 1, wherein the one or more forwarding labels comprise a segment routing label.

9. An apparatus, comprising:

one or more network interfaces to communicate with a network;

a processor coupled to the network interfaces and configured to execute one or more processes; and a memory configured to store a process executable by the processor, the process when executed operable to:

receive a packet that includes one or more forwarding labels and a service function chaining (SFC) header;

remove the one or more forwarding labels from the packet;

insert an indication of the one or more forwarding labels into metadata of the SFC header, wherein the indication includes an application segment identifier associated with the one or more forwarding labels;

associate the application segment identifier with the one or more forwarding labels; and store the one or more removed forwarding labels in a local table in the memory of the device; and forward the packet with the inserted indication of the one or more forwarding labels to a service function.

10. The apparatus as in claim 9, wherein the process when executed is further operable to:

add an entry for the application segment identifier in the local table, in response to determining that the entry does not already exist in the local table.

11. The apparatus as in claim 9, wherein the process when executed is further operable to:

receive the send packet from the service function; and append the stored one or more forwarding labels to the packet.

12. The apparatus as in claim 9, wherein the apparatus inserts the indication of the one or more forwarding labels into the metadata of the SFC header by:

inserting the one or more forwarding labels into the metadata of the SFC header.

13. The apparatus as in claim 9, wherein the process when executed is further operable to:

receive the sent packet from the service function;

remove the one or more forwarding labels from the metadata of the SFC header of the packet received from the service function; and append the one or more forwarding labels to the packet.

14. The apparatus as in claim 9, wherein the SFC header comprises a Network Service Header (NSH)-based header.

15. The apparatus as in claim 14, wherein the indication is inserted into an MD Type-2 type-length-value (TLV) of the NSH-based header.

16. The apparatus as in claim 9, wherein the one or more forwarding labels comprise a segment routing label.

17. A tangible, non-transitory, computer-readable media having software encoded thereon, the software when executed by a processor operable to:

receive a packet that includes one or more forwarding labels and a service function chaining (SFC) header;

remove the one or more forwarding labels from the packet;

insert an indication of the one or more forwarding labels into metadata of the SFC header, wherein the indication includes an application segment identifier associated with the one or more forwarding labels;

associate the application segment identifier with the one or more forwarding labels; and store the one or more removed forwarding labels in a local table in the memory of the device; and forward the packet with the inserted indication of the one or more forwarding labels to a service function.

18. The computer-readable media as in claim 17, wherein the SFC header comprises a Network Service Header (NSH)-based header.

19. The computer-readable media as in claim 17, wherein the process when executed is further operable to:

add an entry for the application segment identifier in the local table, in response to determining that the entry does not already exist in the local table.

20. The computer-readable media as in claim 17, wherein the process when executed is further operable to:

receive the send packet from the service function; and append the stored one or more forwarding labels to the packet.

* * * * *